(12) United States Patent
Kapadia et al.

(10) Patent No.: US 7,039,602 B1
(45) Date of Patent: May 2, 2006

(54) CONFIGURING PRODUCTS WITH DEFAULT SECTIONS DETERMINED ACCORDING TO OPTIMIZATION FUNCTIONS

(75) Inventors: Arshish Cyrus Kapadia, Austin, TX (US); Joseph Loyd Self, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 624 days.

(21) Appl. No.: 09/333,894

(22) Filed: Jun. 14, 1999

(51) Int. Cl.
*G06F 17/60* (2006.01)

(52) U.S. Cl. .......................................... 705/26; 705/10
(58) Field of Classification Search ................ 705/26, 705/27, 10
See application file for complete search history.

(56) References Cited

U.S. PATENT DOCUMENTS

| | | | | |
|---|---|---|---|---|
| 4,209,845 | A | 6/1980 | Berger et al. | 364/900 |
| 4,611,280 | A | 9/1986 | Linderman | 364/300 |
| 4,611,310 | A | 9/1986 | Durbin | 365/230 |
| 4,737,910 | A | 4/1988 | Kimbrow | 364/403 |
| 4,827,423 | A | 5/1989 | Beasley et al. | 364/468 |
| 5,089,970 | A | 2/1992 | Lee et al. | 364/468 |
| 5,101,352 | A | 3/1992 | Rembert | 364/401 |
| 5,128,861 | A | 7/1992 | Kagami et al. | 364/403 |
| 5,148,370 | A | 9/1992 | Litt et al. | 364/468 |
| 5,175,857 | A | 12/1992 | Inoue | 395/800 |
| 5,216,612 | A | 6/1993 | Cornett et al. | 364/468 |
| 5,218,700 | A | 6/1993 | Beechick | 395/700 |
| 5,233,533 | A | 8/1993 | Edstrom et al. | 364/468 |
| 5,280,425 | A | 1/1994 | Hogge | 364/402 |
| 5,303,144 | A | 4/1994 | Kawashima et al. | 364/401 |
| 5,343,388 | A * | 8/1994 | Wedelin | 364/400 |
| 5,369,570 | A | 11/1994 | Parad | 364/401 |
| 5,570,291 | A * | 10/1996 | Dudle et al. | 364/468 |
| 5,594,639 | A | 1/1997 | Atsumi | 364/468.14 |
| 5,630,070 | A | 5/1997 | Dietrich et al. | 395/208 |
| 5,712,985 | A | 1/1998 | Lee et al. | 395/207 |
| 5,712,989 | A | 1/1998 | Johnson et al. | 395/228 |
| 5,809,144 | A | 9/1998 | Sirbu et al. | 380/25 |
| 5,845,258 | A | 12/1998 | Kennedy | 705/8 |
| 5,963,953 | A * | 10/1999 | Cram et al. | 707/102 |

(Continued)

FOREIGN PATENT DOCUMENTS

EP 0 025 405 A1 5/1980

(Continued)

OTHER PUBLICATIONS

Rhythm, a series of 12 Tecnologies web pages. 23 pages, Dated May 26, 2003.*

(Continued)

*Primary Examiner*—Mark Fadok
(74) *Attorney, Agent, or Firm*—Brian E. Harris; James E. Walton

(57) ABSTRACT

A default selection to be presented to a user at configuration time is determined at the time a selection list is presented to the user. A desired function, such as profit maximization or price minimization, is applied against each of the available selections. The selection which thus meets the function's criteria is designated as the default selection, and presented to the user as such. The user may, of course, select any item on the list, but accepting the default selection will tend to maximize desirability of the final product in accordance with the criteria defined by the manufacturer. In accordance with an aspect of the invention, the criteria to be used in choosing default selections may itself be defined at run-time, so that different default selections will be presented to, for example, different users.

42 Claims, 2 Drawing Sheets

U.S. PATENT DOCUMENTS

| | | | | |
|---|---|---|---|---|
| 5,970,474 | A | 10/1999 | LeRoy et al. | 705/27 |
| 5,979,757 | A | 11/1999 | Tracy et al. | 235/383 |
| 5,999,908 | A | 12/1999 | Abelow | 705/1 |
| 6,009,406 | A * | 12/1999 | Nick | 705/10 |
| 6,012,041 | A | 1/2000 | Brewer et al. | 705/28 |
| 6,016,504 | A | 1/2000 | Arnold et al. | 709/200 |
| 6,035,305 | A | 3/2000 | Strevey et al. | 707/104 |
| 6,055,519 | A | 4/2000 | Kennedy et al. | 705/80 |
| 6,085,165 | A * | 7/2000 | Ulwick | 705/7 |
| 6,085,170 | A | 7/2000 | Tsukuda | 705/26 |
| 6,167,383 | A * | 12/2000 | Henson | 705/26 |
| 6,188,989 | B1 * | 2/2001 | Kennedy | 705/8 |

FOREIGN PATENT DOCUMENTS

| | | |
|---|---|---|
| EP | 0 231 552 A1 | 12/1986 |
| EP | 0 425 405 A2 | 8/1990 |
| EP | 0 463 616 A2 | 6/1991 |
| EP | 0 466 089 A2 | 7/1991 |
| EP | 0 466 090 A2 | 7/1991 |
| EP | 0 615 198 A1 | 3/1993 |
| GB | 2 293 902 A | 4/1996 |

OTHER PUBLICATIONS

D. Davis, "Tough Customers," Manufacturing Systems, Wheaton, 6 pages, Nov. 1994.

A. Greene, et al., "MRP II: Out with the Old . . . ; Available: Real-Time EDI, Multiplant Functions, More; MRP II Software Systems; How to Negotiate the Right Price," Computerworld, Framingham, 7 pages, Jun. 8, 1992.

R. Castagna, et al., "A Model for Evaluating Manufacturing System Time Performances," Integrated Manufacturing Systems, v. 3, n. 3, 11 pages, 1992.

D.M. McCutcheon, et al., "The customization-responsiveness squeeze," Sloan Management Review, v. 35, n. 2, 16 pages, Winter 1994.

D. Rhodes, "The keys to the enterprise: integrated applications drive information systems to new horizons—enterprise-wide integration (includes related article on enterprise requirements planning)," HP Professional, v. 5, n. 11, 6 pages, Nov. 1991.

T. Foxlow, "Knowledge-based manufacturing: The key to recovery," Logistics Information Management, v. 7, n. 4, 6 pages, 1994.

L.C. Jasany, "Cut Costs with Integrated Software," Automation, Cleveland, 1 page, Oct. 1987.

M.K. McClelland, "Using Simulation to Facilitate Analysis of Manufacturing Strategy," Journal of Business Logistics, v. 13, n. 1, 16 pages, 1992.

O. Morton, "The uses of time," The Economist, London, V. 330, Issue 7853, 4 pages, Mar. 5, 1994.

K. Parker, "Demand management and beyond," Manufacturing Systems Supply-Chain Strategies: Forecasting and Demand Management Supplement, 6 pages, Jun. 1996.

K. Parker, "What new tools will best tame time?," Manufacturing Systems; Wheaton, vol. 12, Issue 1, 6 pages, Jan. 1994.

F.O. Smith, et al., "Dun & Bradstreet Software Delivers Sales and Promotion System to Manufacturers," Business Wire, 2 pages, Jun. 11, 1990.

PCT, Notification of Transmittal of the International Search Report or the Declaration, 4 pages, Dec. 5, 2001.

PCT, Notification of Transmittal of International Preliminary Examination Report, 5 pages, Oct. 24, 2000.

Anonymous, "Intelligent Manufacturing Report", Intelligent Manufacturing, vol. 1, No. 3, 3 pages, Mar. 1995.

Anonymous, Dialog File 148, No. 8283166, Concentra and i2 Technologies to integrate sales configuration with global supply chain management; Product configuration recognized as critical link in intelligent global supply chain management, Business Wire, 2 pages, Oct. 10, 1985.

C.J. Cavallaro, Dialog file 621 (Gale Group New Prod. Annou. (R)), No. 1007808, "New Para Research MRP II System Adapts Itself to your Business", PR Newswire, 4 pages, Aug. 13, 1985.

Anonymous, MRP upstaged (One trend in the software industry is that the top enterprise-resource-planning software companies are outright supplanting the core planning functions of their manufacturing-resource planning (MRP II) systems or are augmenting them with new scheduling software that provides real-time decision support), Industry Week, v. 246, n. 3, 4 pages, Feb. 3, 1997.

B.M. Kennedy, "Managing Data Associated with Available-to-Promise (ATP) Products," U.S. Appl. No. 09/510,607, pending, Feb. 22, 2000.

B.M. Kennedy, et al., "System and Method for Managing ATP," U.S. Appl. No. 09/504,247, pending, Feb. 15, 2000.

A.C. Kapadia, et al., "System and Method for Promising Delivery of Configured Products," U.S. Appl. No. 09/333,895, pending, Jun. 14, 1999.

* cited by examiner

CONFIGURING PRODUCTS WITH DEFAULT SECTIONS DETERMINED ACCORDING TO OPTIMIZATION FUNCTIONS

BACKGROUND OF THE INVENTION

1. Field of the Invention

The present invention relates generally to electronic computer systems, and more specifically to systems and methods for automatic configuration of orders to ensure availability as desired, with selected optimizations.

2. Description of the Prior Art

With the significant and accelerating increases in digital interconnectivity and machine communications in the last decade, ordering of products from a manufacturer has undergone many changes. In some industries, a sale is no longer a matter of a salesman placing an order and hoping the manufacturing plant can meet the order requirements. Instead, it is necessary to match the manufacturing capability of the plant with orders entered into the system to improve response time and maximize system efficiency.

In certain industries, one technique used by companies to distinguish themselves over their competition is to offer increased levels of customization of their products. For example, a computer manufacturer, often a systems level integrator of independently manufactured subsystems, can make available a wide variety of configuration options. This enables the purchaser to configure a custom system to meet his or her particular needs. However, allowing the purchaser this flexibility puts a tremendous burden on the manufacturer to ensure that all desired products and configurations are available, and available in a timely manner.

When a user customizes the configuration of his product, actual assembly of the product takes place after the order is entered. Examples of industries using this approach are the personal computer and automobile industries. Although some products are sold pre-configured, others are assembled to the customer's order. After the order is entered, the manufacturing facility must assemble the order as specified. This after order assembly requires that predicted delivery dates be provided to the customer at the time the order is entered.

In recent years, to deal with this complex problem, powerful systems have been implemented to assist with order entry and custom product configuration. Products such as the RHYTHM system available from I2 Technologies, and similar products from other sources, have seen increasing acceptance as manufacturers strive to provide improved customer service. Among other features, these systems generally provide a configuration engine to assist the purchaser in defining and customizing her product. Once the product has been defined, an Available to Promise (ATP) engine ensures that all of the required components are available, and commits to a shipping date.

The configuration engine, also referred to as a configurator, contains a sometimes complex set of rules defining valid product configurations. Not all possible configurations of subsystems and components are allowed by the seller. For example, a company in the computer assembly industry can allow only selected combinations of processors, disk storage units, displays, and memory configurations. These limitations act as constraints on the selection of which components can be used to assemble the final product. Because even a relatively limited offering can give rise to a large number of possible component combinations, the logic required to perform the configuration function can be quite large and complex.

From the purchaser's perspective, an interface is provided to the configuration engine which enables component selections to be made. For example, the user can select a particular type of base computer system to be purchased. The configuration engine will then lead the purchaser through a series of selections to customize the final product as desired. Of course, the customer is entitled to select a predefined package, but it is often the case that one or more variations from the standard product is desired.

As each selection is made, it imposes additional constraints on the set of valid configurations. Thus, prior selections constrain the user in making later selections. For example, in the computer assembly context, purchaser selection of a laptop computer, as opposed to a desktop model, will influence the components which may be selected to go into the final product. For example, once a laptop has been selected, only displays which are compatible with that laptop may be selected in the future. The configuration engine maintains the relationships necessary to ensure that the purchaser selects from only valid component choices.

Once the purchaser has completed definition of a product, the configuration engine submits the order to the manufacturer, which may be represented to the configuration engine as an Available to Promise engine. The ATP engine confirms the availability of all of the components required to assemble the product, including the availability of sufficient manufacturing resources to assemble the components into the final product. Some of the components and resources may not be available until some time in the future. The ATP system then confirms the order back to the purchaser at the user interface, provides a delivery date, and commits the components and resources at the manufacturing level.

When presenting a list of selections to a user, some systems will designate a default selection for the user. This is generally a selection chosen ahead of time by the manufacturer so that the final configuration defined by the user will be complete. In other words, use of a default for each selection enables a complete product to be configured.

It would be desirable to provide a mechanism for choosing a default user selection which maximizes or minimizes some function desired by the manufacturer. It would be further desirable to perform such selection at the time the user is selecting his product configuration in order to provide and enhance the default selection decision.

SUMMARY OF THE INVENTION

Therefore, in accordance with the present invention, a default selection to be presented to a user at configuration time is determined at the time a selection list is presented to the user. A desired function, such as profit maximization or price minimization, is applied against each of the available selections. The selection which thus meets the function's criteria is designated as the default selection, and presented to the user as such. The user may, of course, select any item on the list, but accepting the default selection will tend to maximize desirability of the final product in accordance with the criteria defined by the manufacturer. In accordance with an aspect of the invention, the criteria to be used in choosing default selections may itself be defined at run-time, so that different default selections will be presented to, for example, different users. Defaults are designated for all configuration choices which need to be made for the product, so that a complete product is defined even when the user does not make, or has not yet made, selections for all choices.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The present invention is useful in the context of order entry for industries which allow product customization by customers, but is not limited to such applications. The examples and description below, for purposes of illustration, assume that a user wishes to customize a single product, and that the product will be assembled, or assembly will be completed, only after an order is finally entered and committed. The customization process is assumed to allow a user to select items, or components, from lists of choices to provide the customized product. For each portion of the product which can be customized, one or more selections form a list will need to be made by the user.

The present invention pertains to identification of a default selection to be presented to a user out of a list of selections at configuration time. In order to best identify a preferred default selection, in the preferred embodiment it is necessary to provide configuration-time information regarding products which are available to be chosen by the user. Co-pending patent application Ser. No. 09/333,895, titled "System and Method for Promising Delivery of Configured Products", filed concurrently herewith, describes in detail a preferred system which provides the necessary coupling. The description which files also describes a preferred system which can be utilized to implement the present invention, but additional details of the underlying system can be filed in the referenced patent application which is hereby incorporated by reference herein.

Figure 1:
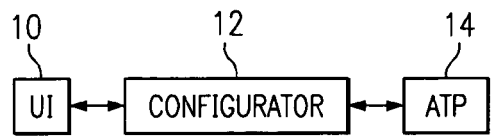
FIG. 1 is a high level block diagram of an order entry system in accordance with the present invention.

As illustrated in FIG. 1, a purchaser enters an order through a user interface 10. The user interface 10 is connected to a configuration engine 12, also referred to as a configurator, which provides the intelligence to restrict the selections made by the user to a set defined in advance by the manufacturer. The configuration engine 12 includes logic implementing a set of rules and relations defining the allowable configurations of components which may be selected by the user to configure products sold by the manufacturer.

The configuration engine 12 is connected to an available to promise (ATP) engine 14. As known in the art, the ATP engine 14 includes a database which identifies all components and subsystems which are currently actually available, and the dates on which they can be shipped. Subsystems of components can be shipped only on the latest date all of the components which make up that subsystem are available. The ATP engine commits to dates on which the components and subsystems will be available to ship to the purchaser.

In prior art systems, a completed order was submitted to the ATP engine 14 by the configuration engine 12. In the present invention, however, the configuration and ATP engines 12, 14 are much more tightly coupled than in prior art systems. In the preferred embodiment, a request is made to the ATP engine 14 immediately before a selection is presented to the user. The configuration engine 12 determines a set of items to be presented for selection according to its defined rules. Each of the items in the set is communicated to the ATP engine 14, which returns an indication of availability and a delivery date for each item to the configuration engine 12. The configuration engine 12, through the user interface 10, then presents to the user only those items which are actually available for selection, and the earliest delivery date on which all selections are actually available. In other words, an individual item may be available earlier, but the product is not available until the latest delivery date of the items which make up the product.

The term available does not necessarily mean that an item is currently in stock, but that it will be available by the time that it is needed. Thus, when the ATP engine indicates that a component will be available in two weeks, that component may not yet be physically present, but is expected to be no later than two weeks from the present time. The process of committing to product shipments can extend of many levels of manufacturing, so that the final assembly entity assumes availability of products which are currently several levels down the manufacturing chain. So long as all manufacturers are able to meet their commitments, the products will actually be there when needed. Communication with suppliers to keep the incoming product pipelines full is one of the functions of the ATP engine.

Once a selection is made by the user, the configuration engine 12 determines a next set of items to be presented for selection. The above process is repeated until the product is completely configured. Once a final product configuration is obtained, it is submitted to the ATP engine for a commitment of the order. Because each selection was made from a list of items known to be available, the user is constrained to enter only valid and available product configurations. The only circumstance in which a final order can be rejected is if one or more items become unavailable between the initial selection of that item and final order commitment, which is a relatively unlikely event.

Figure 2:
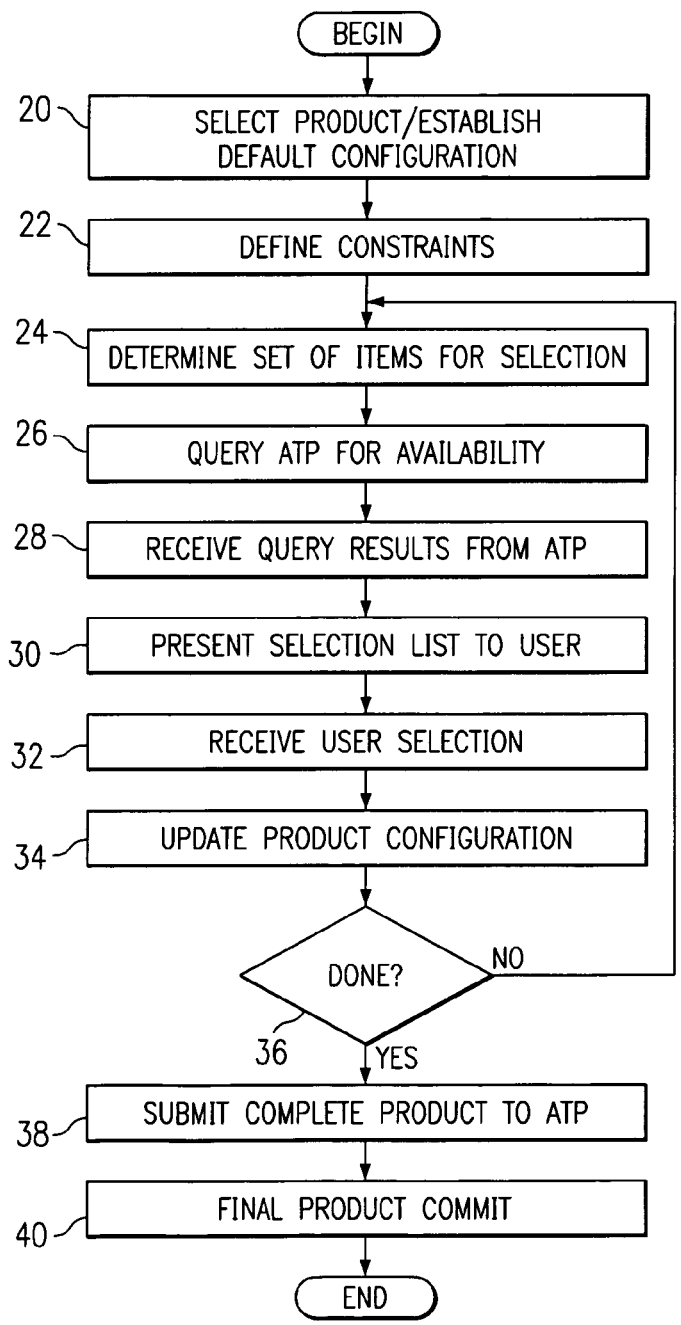
FIG. 2 is a flowchart illustrating operation of a preferred embodiment of the order entry system of the invention.

FIG. 2 is a high level flowchart giving more details of the process outlined above. The following description assumes that only a single product is being configured, but the same steps are used when multiple products are purchased in a single order.

Initially, the product to be purchased is selected by the user 20. The configuration engine contains sets of static configuration constraints for each product, and the appropriate static configuration is set up for the selected product. Unlike prior art systems, no static default selections are established for each item. Instead, defaults are preferably dynamically selected based upon an optimization function defined by the manufacturer and applied to the database of available items at run time. At any time, if the user wishes to accept the product, even if more choices can be made for some components, the user can end the configuration process and accept a complete product. If any additional constraints are to be applied to the configuration, such as requiring a particular ship date, these are defined and entered 22 into the configuration engine for use in pruning future selections.

Although it is useful that defaults selections are presented as such to the user, an important part of the preferred implementation is that defaults are selected so that a complete product is defined. For a product to be completely defined, certain items must be selected out of the sets of available items. For example, a car requires a body, engine, and interior, but an air conditioner may not be required. Unless all of the required selections are made, the product is not complete.

In the preferred embodiment, a complete product is always defined. When a configuration session begins, the configuration engine determines which selections must be made for the product to be complete, and makes default selections for them at the beginning. Then, no matter what selections are made by the user, a complete product is always defined, if the user does not make selections from some lists of items, the product remains complete. Thus, the user need only make those selections that are of interest to him, with all remaining selections being fulfilled by the defaults originally selected by the configuration engine.

The configuration engine then determines a set of items to be presented to the user for selection 24. The initial set, and subsequent sets based upon earlier selections made by the user, are defined via constraints within the configuration engine in a manner known in the art. Before actually displaying the items and allowing the selection to be made, the ATP engine is queried to determine the actual availability of each of the items 26. This may be done by collecting all of the items into a group and making a single query, with the ATP engine returning a result data structure 28 containing an indication of availability and possible shipping date for each item. In practice, to reduce the number of queries to the ATP engine, an implementation can move some constraints from the ATP engine to the configuration engine, but the conceptual operation is unchanged. Constraints suitable for moving to the configuration engine are those for items which have no shared dependencies. (ie, those items not used in more than one subassembly).

In the preferred embodiment, the act of querying the ATP engine for availability does not enter an order and commitment transaction. In other words, the items which are the subject of the query are not reserved or committed at the time of the inquiry, but are only committed later at the time of final order entry. This could result in a user defining a product which is a valid, available configuration when defined, but which becomes unavailable by the time the final order is entered for confirmation and commitment. However, this approach avoids the problems which can occur as a result of committing each component as it is selected, followed by uncommitting these components later if the configuration is changed or no final order is entered. Although not preferred, the latter approach can be used in certain circumstances if desired.

In addition, most problems are avoided by a reasonably intelligent ATP engine. When the actual supply of a component runs low, or the expected availability of that component in the future becomes borderline or uncertain, the ATP engine can treat the situation as one in which the component is simply unavailable. Additionally, a high level of enquiries for a component indicates that orders will probably be placed against the components very soon, so that tracking such enquiries may indicate that a component should be indicated as unavailable even though the number of actual commitments has not depleted the supply. Good requirements planning will also minimize any problems.

After the query result is received from the ATP engine, a list of valid, available selections is presented 30 to the user. Typically, an indication is made to the user of the available shipping date for each selection. This allows the user to see the impact on delivery of decisions made during configuration. If the user defined a preferred shipping date as a constraint in step 22, this constraint is used to further prune the list of valid selections before presentation to the user. In other words, the configuration engine considers as unavailable any component which is only available after the required shipping date. This may mean that less configurations are available for the user than is the case with unrestricted dates, but the user can balance desired delivery dates against the possibility of more options to choose from.

The user then selects one of the available options from the list, which the configuration engine accepts 32 and uses to update the product configuration 34. The updated product configuration may impose additional constraints on later choices, and may also make additional choices available. For example, if a user is configuring a truck, selection of a larger engine may make future selections of tires and fuel tank available which would not be the case if a smaller engine were selected. If a selection will make additional selections necessary to completely define a product, additional default selections will be added to the configuration as well. As was the case with step 20, this ensures that a complete product configuration is always defined.

If the final user selection has not yet been made (step 36), the configuration engine determines the next set of items for selection 24 and repeats the process. Earlier selections modify the initial constraints as described above.

Once the last selection has been made (step 36), or if at any time the user indicates that for the remaining selections the defaults are acceptable, a completed order for the product is submitted to the ATP engine 38. This submission is different from the previous enquiries for availability, in that order submission causes the ATP engine to commit the necessary components and resources required to assemble the product. If component or resource availability have changed during the configuration process, it is possible that the ATP engine may not be able to commit to the final order, or that the commit date will be later than previously determined. Because this is a relatively unlikely event, the preferred embodiment provides for no commitment until the final order is entered, rather than committing resources and components during the configuration process, which may have to be undone relatively more often.

At this time the process for configuring the product is complete. Of course, additional products may be configured in a single session, and orders may be withdrawn with the accompanying requirement for reversing the resource and component commitments previously made. These typical procedures are known in the art, and may easily be incorporated into the process of the invention.

In addition to providing a completely configured product for the user, a manufacturer may have additional goals connected with the sale of the product. These goals can be realized by using optimized defaults as will now be described.

Because it is common for users to select an item which has been presented as a default, out of each list, intelligent selection of such defaults can be used meet optimization goals defined by the manufacturer. These optimization goals can include, for example, maximizing profit of the final product, maximizing profit on each of the components included within the product (a closely related problem), minimizing overall price of the product, and increasing sales of components selected by the manufacturer, such as those which may currently be in an overstocked condition. The user is always free to select any item from the available list, but the selection of choices presented as defaults enables intelligent configuration default utilization to assist in the manufacturer's optimization goals. IN addition, many available choices are of no interest to the user, and no selection at all is made for these. Here, the defaults selected by the system become the user's "choices."

In general, intelligent identification of default selections is performed dynamically. The item presented as the default may change over time, and as a function of user identity or needs. The previously described tight coupling between the configuration engine and the ATP engine enables this optimization to be performed in a relatively straightforward manner.

During each configuration session, an optimization function is identified which is to be applied to selection of default items. These defaults ensure a complete, valid product configuration at all times, and will be presented to the user as defaults when selections are made. If desired, more than one optimization function can be operated simultaneously, although this complicates the calculation somewhat. The optimizations to be applied can be determined in part by the user and in part by the manufacturer. For example, if the user is configuring a computer system, indication that this system is to be used in the home might indicate that a minimum retail price optimization is to be used, whereas identification that this computer is to be used in the office might cause a "maximize profit" optimization to be used. In either case, it is possible that the manufacturer could have an additional optimizing function for preferring an overstocked component regardless of the price or profit associated with the items in the selection list.

When the available items are returned from the ATP server, associated with each available item is information necessary for the configuration engine to determine which should be selected as the default item. If the optimization criteria is to minimize price by minimizing the price of each of the items, each item that is available must return with it data indicating the price of that item. If the optimization goal is to maximize profit, each of the available items must return a profit number associated with that item so that the configuration engine can select the highest profit item for presentation to the user as the default. Of course, any other criteria to be used in the optimization decision is returned to the configuration engine in a similar manner.

Figure 3:
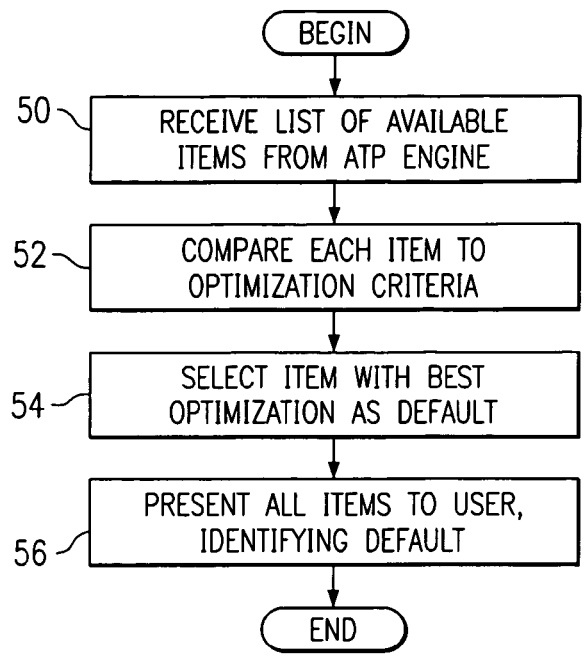
FIG. 3 is a flowchart illustrating a method for optimizing selection of a default item to be presented to a user.

FIG. 3 is a flowchart outlining how the selection of the default item is made within the configuration engine. Initially, the configuration engine receives a list of available items from the ATP engine 50. As described above, only items which are actually available will be returned from the ATP engine. Along with the list of available items, is the information needed to make the optimization decision. As described above, this can be, for example, price or profit information, but can be any information about the available items which the manufacturer wishes to use to make the optimization decision.

Each item in the returned list is compared to the optimization criteria 52, and the item with the best value matching the optimization criteria is selected as the default item 54. When the list of the available is presented to the user, the default item is identified as such to the user 56.

The format in which the default item is identified to the user will, of course, depend upon the details of the user interface. The default item may, for example, be placed at the top of a column to be selected. It may also be highlighted or designated in some manner, and the default item may be placed in a location of preference, such as an interface box in which the user identifies the item to be selected. Those skilled in the art will recognize numerous alternative techniques which can be used to present the selected default item to the user.

Figure 4:
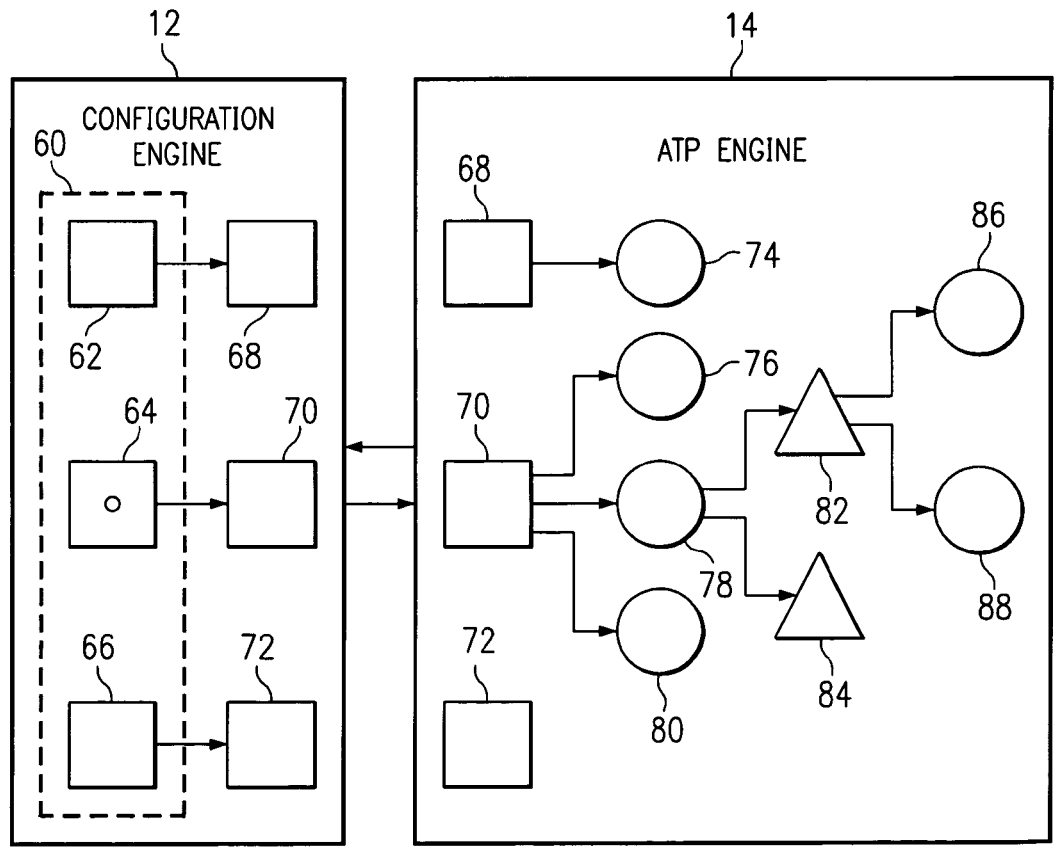
FIG. 4 is a block diagram illustrating further details of the preferred embodiment.

FIG. 4 illustrates additional details of the preferred implementation. Within the configuration engine 12, the user has a set 60 of three items 62, 64, 66 from which to choose. These items may be referred to as configuration options, as they are the options the user has to place into her configuration. Each configuration option corresponds to an orderable item 68, 70, 72. Of course, in an actual implementation the sets of options and orderable items in the configuration will be much more complex, but this simple example serves to illustrate operation of the invention.

Prior to submitting a group of items to the user for selection, the configuration engine sends a request to the ATP server to determine which items are available. The items 68, 70, 72 are communicated to the ATP engine, which contains information about all items available in the system. In the example of FIG. 4, orderable item 68 corresponds to one manufacturable item 74, orderable item 70 corresponds to three (76, 78, 80), and item 72 is not available.

The three items 76, 78, 80 are alternative manufacturable items, any of which can be used to satisfy the request for orderable item 70. For example, if item 70 is an eight gigabyte hard drive for a computer system, items 76, 78, and 80 could represent products by different manufacturers. Availability, cost, and profit margins could be different for each of these items, which will be reflected in the selection of a default item to present to the user.

The types and relationships of items which can be used to fulfill a request can be relatively complex. For example, in FIG. 4 manufacturable item 78 can be an assembly comprising two subassemblies 82 and 84, and subassembly 82 can itself be made from parts 86 and 88. The structures representing relationships and subrelationships can extend as deeply as needed to describe the available products. It can, in fact, extend to other companies which supply the assemblies and subassemblies needed by the manufacturer.

The request to the ATP server results in a list of available items being passed back to the configuration engine 12. This enables the configuration engine 12 to determine which item is to be presented to the user as the default selection item. In the example shown, item 70, corresponding to the user's selectable option 64, is presented as the default.

The selection of items to be presented as defaults can extend more deeply than just the items being presented to the user. In the example shown in FIG. 4, assume that the optimization being used is to minimize retail price. Each of the manufacturable items 76, 78, 80 are alternates which can be used to satisfy an order for item 70. Each manufacturable item 76, 78, 80 has a retail price associated with it, and they may be different. The ATP engine can select which of the three 76, 78, 80 has the lowest retail price, and return that as the manufacturable item corresponding to orderable item 70. Thus, the optimization proceeds not only between orderable items 68, 70, 72, but also among the items which can be used behind the scenes to satisfy the orderable item requests.

In the case of more complex optimizations such as just described, it is often preferred to have the process of selecting default items to occur in the ATP engine rather than in the configuration engine. This allows the ATP engine to select from all available product components to provide the best selection for the default. In this approach, the configuration engine need merely pass to the ATP engine an identification of the type of optimization desired, and the best default selection will be flagged when the list of available items is returned to the configuration engine. This places a slightly greater computational burden the ATP engine for each availability transaction, but allows greater flexibility and intelligence in the optimization process.

In addition, more than one optimization may proceed concurrently, as previously described. If, for example, manufacturable item 68 is currently overstocked, the ATP engine can also be instructed to indicate such item as the default unless there is a price difference between it and the lowest priced item of a selected amount. This would allow manufacturer dynamic situations to influence the optimization process beyond a simple one such as minimize price. It is generally more efficient and easier to provide all optimization calculation in the ATP engine if multiple concurrent optimizations are to be calculated concurrently.

In addition to the optimizations discussed above, a second level of optimizations is preferably carried out within the ATP engine. In many cases, the user will not select the item designated as the default. When this happens, the ATP engine can still perform optimizations on the selection made by the user when alternatives are available. This allows the manufacturer to optimize to the extent possible within the selections made by the user, in addition to whatever optimization occurs as a result of designating default selections.

For example, suppose the user is configuring a computer system. The default selected at the initiation of the session designates a 2 gigabyte hard drive as the default. During configuration, the user selects an 8 gigabyte hard drive. The ATP engine can still perform optimizations on this selection by choosing, from several alternatives available, the one that best fits the optimization function. For example, if the system is being optimized to minimize cost, the least expensive 8 gigabyte hard drive can be selected by the ATP engine for inclusion in the system.

This optimization would actually be performed prior to the selection by the user. When the alternatives are being checked for availability, the 8 gigabyte hard drive best fitting the optimization function is selected initially, so that when the user selects that option it is already the best optimized selection. In the above example, the user, by selecting an 8 gigabyte hard drive, is selecting the least expensive one available, because the cost optimization process has already been performed among the available 8 gigabyte hard drives.

It is not necessary, or in some cases even possible, for perfect optimization to be calculated for each item set to be presented to the user. For example, selecting the lowest price for each component will generally result in either the lowest, or near to it, total product price being selected. However, sometimes selecting the lowest priced component now will place a constraint on future selections which will actually raise the final total price somewhat above the lowest possible one. Generally, it will not be desirable to perform a complex calculation of all possible item combinations to select the one leading to the actual lowest price. This would complicate the optimization calculation by adding product configuration constraints, and would seldom result in a significantly better result. Instead, the preferred technique provides for optimization of each selection step independently. Thus, for a maximal profit optimization, the preferred approach is to determine the maximum profit of the items available at each stage of the selection.

Optimization functions can be selected to be as simple or complex as desired. Optimization of a function using alternative choices as described is well within the skill of those skilled in this art, and will not be described in detail. Suffice it to say that any abstract business criterion which can be expressed mathematically can be used for optimization. For example, the price minimization and profit maximization functions described above can be used. The described goal of preferring overstocked items, or other items having a special status for the manufacturer, will be a common optimization. Optimizing delivery dates is another approach. Rather than simply indicating to the user how each selection will impact his product delivery date, the indicated default can be the item which provides for the shortest time to delivery. Many other possibilities will be apparent to those skilled in the art.

Another variation on the basic approach, mentioned above, is to vary the optimization function used on a user by user basis. For example, different optimizations can be made when the user is buying for home use than for a business customer. A large volume order may be given a different optimization function than a small order. Information regarding past purchases by a particular customer can be used to make optimization selections the next time he configures a product, and in fact his previous selections can be used to override calculated defaults if desired. Sophisticated systems for capturing customer information can guide optimization decisions to provide a high percentage of defaults actually selected by the user. For example, upgrades beyond the boundaries of the initial selections can be presented for users who have purchased such enhanced systems in the past.

The customer may even be allowed to select optimizations in order to guide the defaults which are presented to her. For example, when configuring a car, the user may be able to select for several general configuration packages, which will present different defaults. When purchasing a computer, the user may be allowed to select from optimizations based on price or maximum system capability. Within these selected optimizations, the manufacturer may select for maximum profits from otherwise equal items.

While the invention has been particularly shown and described with reference to a preferred embodiment, it will be understood by those skilled in the art that various changes in form and detail may be made therein without departing from the spirit and scope of the invention.

What is claimed is:

1. A method for configuring a product, comprising:

initiating a configuration session in which a user configures a product comprising a configuration of items selected from a plurality of items;

generating a series of selection option sets, each selection option set comprising one or more items;

during the configuration session, for each of the series of selection option sets, receiving data from an available to promise engine regarding the one or more items in the selection option set;

during the configuration session, for each of the series of selection option sets, dynamically applying an optimization function with respect to each item in the selection option set according to the data received from the available to promise engine during the configuration session to identify an item of the selection option set as a default selection, the default selection being optimal among the one or more items of the selection option set with respect to the dynamically applied optimization function;

providing for presentation to the user the series of selection option sets, each selection option set comprising its identified default selection;

accepting from the user a selection of an item for each of the series of selection option sets; and determining a configuration for the product in accordance with the selections of the items from the series of selection option sets.

2. The method of claim 1, wherein each selection option set presented to the user is checked before presentation to confirm that all items in the selection option set are actually available to the user in accordance with a user-specified date constraint.

3. The method of claim 1, wherein identifying an item of the selection option set as a default selection comprises identifying the item that provides an optimized fit according to the optimization function.

4. The method of claim 1, wherein the optimization function maximizes manufacturer profit.

5. The method of claim 1, wherein the optimization function minimizes price to the user.

6. The method of claim 1, wherein the optimization function is defined during the configuration session.

7. The method of claim 1, wherein the optimization function is defined in response to an identification of the user during the configuration session.

8. The method of claim 1, wherein the optimization function is defined in response to a product selection decision made by the user during the configuration session.

9. A method for configuring a product, comprising:
providing for presentation to a user during a configuration session a series of selection option sets, each selection option set comprising one or more items;
during the configuration session, for each of the series of selection option sets, receiving data from an available to promise engine regarding the one or more items in the selection option set;
during the configuration session, for each selection option set, before presenting the selection option set to the user, determining which of the items of the selection option set are actually available to the user in accordance with a user-specified date constraint and presenting only those items of the selection option set which are actually available to the user in accordance with the user-specified date constraint;
during the configuration session, for each of the selection option sets, identifying as a default selection an item that provides an optimized result according to a selected optimization function dynamically applied with respect to each item in the selection option set according to the data received from the available-to-promise engine during the configuration session; and
for each selection option set, accepting a selection of an item from the user.

10. The method of claim 9, further comprising:
before any selection option sets are presented to the user, defining configuration information to provide the series of selection option sets to be presented to configure the product; and
within the determining step, determining which of the items in the defined configuration information are actually available to the user.

11. The method of claim 10, further comprising:
as selections are made by the user, adding one or more constraints to later presented selection option sets; and
within the determining step, determining which of the items in the defined configuration information meet the one or more constraints added by user selections and are actually available to the user.

12. The method of claim 9, wherein the selected optimization function is selected during the configuration session with the user in which the product configuration is performed.

13. The method of claim 12, wherein the selected optimization function is selected as a function of an identity of the user during the configuration session.

14. The method of claim 12, wherein the selected optimization function is selected by the user during the configuration session.

15. The method of claim 9, wherein the default selection provides an optimized result according to a second optimization function in addition to the selected optimization function.

16. The method of claim 9, wherein the selected optimization function comprises a function which minimizes price to the user.

17. The method of claim 9, wherein the selected optimization function comprises a function which maximizes profit to a manufacturer.

18. The method of claim 9, wherein the selected optimization function comprises a function which minimizes time to delivery of the product.

19. A system for configuring a product, comprising:
a configuration engine operable to, during a configuration session:
communicate with a user interface operable to display a plurality of lists of items to a user and to accept a plurality of selections from the user, each list comprising one or more items, each list comprising a default item; and
generate the lists of items according to stored configuration information; and
an available to promise engine operable to:
store information regarding availability of the items in the lists of items generated by the configuration engine; and
during the configuration session, for each list of items generated by the configuration engine, return to the configuration engine a sub-list of one or more of the items which are actually available to the user in accordance with a user-specified date constraint;
during the configuration session, for each of the one or more items in the sub-list which are actually available to the user in accordance with the user-specified date constraint, return to the configuration engine data regarding the item to enable dynamic application of an optimization function with respect to the item;
the default item for each list being determined during the configuration session by dynamically applying an optimization function to each item in the returned sub-list of one or more items which are actually available to the user in accordance with the user-specified date constraint, the optimization function being dynamically applied to the item according to the returned data regarding the item, the default item for each list being optimal among the one or more items in the returned sub-list with respect to the dynamically applied optimization function.

20. The system of claim 19, wherein the configuration engine is operable to determine one or more of the lists of items in response to selections made by the user during the configuration session.

21. The system of claim 20, wherein the configuration engine is operable to apply the optimization function to the sub-list of actually available items returned from the available to promise engine.

22. The system of claim 20, wherein the available to promise engine is operable to:
apply the optimization function to the items which are actually available before returning the sub-list to the configuration engine; and
identify the default item when the sub-list of actually available items is returned.

23. The system of claim 20, wherein:
for each list of items to be displayed to the user, the configuration engine is operable to pass to the available to promise engine a list of proper configuration items; and
for each list of proper configuration items, the available to promise engine is operable to:
determine which items are actually available to the user;
apply the optimization function to each actually available item; and
return to the configuration engine a sub-list of actually available items and an identification of which actually available item best matches the optimization function.

24. The system of claim 19, wherein the optimization function comprises a function for minimizing product price.

25. The system of claim 19, wherein the optimization function comprises a function for maximizing profits.

26. The system of claim 19, wherein the optimization function comprises a function for minimizing delay until the product is available.

27. A method for configuring a product, comprising:
initiating a configuration session in which a user configures a product, the product comprising a configuration of items selected from a series of lists, each list comprising one or more items selected from a plurality of items;
during the configuration session, for each of the series of lists, receiving data from an available to promise engine regarding the one or more items in the list;
during the configuration session, for each of the series of lists, dynamically applying an optimization function with respect to each item in the list according to the data received from the available to promise engine during the configuration session to identify a default selection comprising an item of the list that optimizes the dynamically applied optimization function relative to any other items in the list;
providing for presentation to the user the series of lists each comprising the one or more items including the identified default selection for the list; and
determining a configuration for the product in accordance with the selection of items from the series of lists.

28. The method of claim 27, further comprising repeating the following for each list of the series of lists until a last list is reached:
receiving from the user a selection of an item from a current list comprising one or more items;
generating a next list comprising one or more items in accordance with the selection of the item from the current list;
applying an optimization function with respect to each item in the next list to identify a default selection comprising an item of the next list that optimizes the optimization function relative to any other items in the next list; and
providing for presentation to the user the next list comprising the one or more items including the identified default selection for the next list.

29. The method of claim 28, wherein generating the next list comprises:
determining a valid item configuration for the product in accordance with the selection of the item from the current list and in accordance with a constraint restricting selection of an item for the product; and
generating the next list comprising only one or more items of the valid item configuration.

30. The method of claim 28, wherein generating the next list comprises:
determining one or more items of the next list that are actually available to the user in accordance with a user-supplied date constraint restricting selection of an item for the product; and
generating the next list comprising only the one or more items of the next list that are actually available to the user in accordance with the user-supplied date constraint restricting selection of an item for the product.

31. The method of claim 27, wherein the optimization function comprises a function for minimizing product price.

32. The method of claim 27, wherein the optimization function comprises a function for maximizing profits.

33. The method of claim 27, wherein the optimization function is selected as a function of an identity of the user.

34. The method of claim 27, wherein the optimization function is selected by the user.

35. A system for configuring a product, the system comprising one or more software components embodied in computer-readable media that when executed are collectively operable to:
initiate a configuration session in which a user configures a product, the product comprising a configuration of items selected from a series of lists, each list comprising one or more items selected from a plurality of items;
during the configuration session, for each of the series of lists, receiving data from an available to promise engine regarding the one or more items in the list;
during the configuration session, for each of the series of lists, dynamically apply an optimization function with respect to each item in the list according to the data received from the available to promise engine during the configuration session to identify a default selection comprising an item of the list that optimizes the dynamically applied optimization function relative to any other items in the list;
provide for presentation to the user the series of lists each comprising the one or more items including the identified default selection for the list; and
determine a configuration for the product in accordance with the selection of items from the series of lists.

36. The system of claim 35, operable to repeat the following for each list of the series of lists until a last list is reached:
receiving from the user a selection of an item from a current list comprising one or more items;
generating a next list comprising one or more items in accordance with the selection of the item from the current list;

applying an optimization function with respect to each item in the next list to identify a default selection comprising an item of the next list that optimizes the optimization function relative to any other items in the next list; and providing for presentation to the user the next list comprising the one or more items including the identified default selection for the next list.

37. The system of claim 36, operable to generate the next list by:

determining a valid item configuration for the product in accordance with the selection of the item from the current list and in accordance with a constraint restricting selection of an item for the product; and generating the next list comprising only one or more items of the valid item configuration.

38. The system of claim 36, operable to generate the next list by:

determining one or more items of the next list that are actually available to the user in accordance with a user-supplied date constraint restricting selection of an item for the product; and generating the next list comprising only the one or more items of the next list that are actually available to the user in accordance with the user-supplied date constraint restricting selection of an item for the product.

39. The system of claim 35, wherein the optimization function comprises a function for minimizing product price.

40. The system of claim 35, wherein the optimization function comprises a function for maximizing profits.

41. The system of claim 35, wherein the optimization function is selected as a function of an identity of the user.

42. The system of claim 35, wherein the optimization function is selected by the user.

* * * * *